US011818425B2

United States Patent
Reid et al.

(10) Patent No.: US 11,818,425 B2
(45) Date of Patent: *Nov. 14, 2023

(54) METHODS, SYSTEMS, AND MEDIA FOR PRESENTING CAPTION INFORMATION BASED ON VOLUME SETTING ADJUSTMENTS

(71) Applicant: Google LLC, Mountain View, CA (US)

(72) Inventors: Bryce Gibson Reid, Burlingame, CA (US); Robert Thompson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,099

(22) Filed: Feb. 8, 2021

(65) Prior Publication Data
US 2021/0168438 A1 Jun. 3, 2021

Related U.S. Application Data

(63) Continuation of application No. 16/615,681, filed as application No. PCT/US2017/066020 on Dec. 13, 2017, now Pat. No. 10,917,687.

(51) Int. Cl.
*H04N 21/439* (2011.01)
*G06F 3/16* (2006.01)
(Continued)

(52) U.S. Cl.
CPC ......... *H04N 21/4396* (2013.01); *G06F 3/165* (2013.01); *G10L 21/10* (2013.01);
(Continued)

(58) Field of Classification Search
CPC ......... H04N 21/4396; H04N 21/41407; H04N 21/4312; H04N 21/47217; H04N 21/4884; G06F 3/165; G10L 21/10
See application file for complete search history.

(56) References Cited

U.S. PATENT DOCUMENTS 5,327,176 A * 7/1994 Forler ................. H04N 21/47
348/564
5,428,400 A * 6/1995 Landis ............... H04N 21/4884
348/461
(Continued)

OTHER PUBLICATIONS

International Search Report and Written Opinion dated Jun. 13, 2018 in International Patent Application No. PCT/US2017/066020.
(Continued)

*Primary Examiner* — Jason K Lin
(74) *Attorney, Agent, or Firm* — Shumaker & Sieffert, P.A.

(57) ABSTRACT

Methods, systems, and media for presenting caption information based on volume setting adjustments are provided. The method comprises: during playback of a video content item in a media playback application, causing a volume interface that corresponds to the media playback application to be presented, wherein the volume interface includes a lowest volume setting and a caption interface element; determining that a first user selection has been received that causes the volume interface to be at the lowest volume setting of the volume interface; in response to determining that the first user selection has been received, causing the video content item being presented in the media playback application to be in a mute state in which audio content associated with the video content item is muted, updating the volume interface by positioning a highlight region over the lowest volume setting, and presenting a contextual interface element that indicates the mute state of the media playback application; determining that a second user selection has been received that corresponds with decreasing volume of the audio content associated with the video content item while the video content item being presented in the media playback application is in a mute state; and, in response to determining that the second user selection has been received,
(Continued)

updating the volume interface by positioning the highlight region over the caption interface element, presenting the contextual interface element that indicates a caption state of the media playback application, and causing caption information associated with the video content item to be presented.

20 Claims, 12 Drawing Sheets

(51) Int. Cl.
  *G10L 21/10* (2013.01)
  *H04N 21/414* (2011.01)
  *H04N 21/431* (2011.01)
  *H04N 21/472* (2011.01)
  *H04N 21/488* (2011.01)
(52) U.S. Cl.
  CPC ... *H04N 21/41407* (2013.01); *H04N 21/4312* (2013.01); *H04N 21/47217* (2013.01); *H04N 21/4884* (2013.01)

(56) References Cited

U.S. PATENT DOCUMENTS

| | | | |
|---|---|---|---|
| 8,804,047 | B2 | 8/2014 | Mears |
| 8,977,974 | B2 | 3/2015 | Kraut |
| 10,453,572 | B1* | 10/2019 | Brooks ............... G16H 40/40 |
| 10,466,955 | B1* | 11/2019 | Gray ................... G06F 3/165 |
| 2004/0076269 | A1* | 4/2004 | Engelke ............... H04M 11/04 379/40 |
| 2005/0038661 | A1* | 2/2005 | Momosaki ......... H04N 21/4394 704/275 |
| 2006/0020991 | A1* | 1/2006 | Goto ................... H04M 1/72403 725/106 |
| 2006/0221257 | A1* | 10/2006 | Nakayama ......... H04N 21/4852 348/738 |
| 2007/0211174 | A1* | 9/2007 | Putterman .......... H04N 21/4858 348/588 |
| 2010/0066904 | A1* | 3/2010 | Schindler ........... H04N 21/4884 348/468 |
| 2012/0194742 | A1* | 8/2012 | Barnes ............. H04N 21/47815 348/569 |
| 2012/0213492 | A1* | 8/2012 | Takeuchi ............. H04N 13/183 386/E5.009 |
| 2013/0278824 | A1* | 10/2013 | Einarsson ........... H04L 65/1089 348/468 |
| 2015/0363091 | A1* | 12/2015 | Lee ..................... G06F 3/04847 715/722 |
| 2017/0068507 | A1* | 3/2017 | Kim ..................... G06F 3/167 |
| 2018/0014066 | A1* | 1/2018 | Berman ........... H04N 21/47217 |
| 2019/0306563 | A1* | 10/2019 | Chen ................... H04N 21/439 |

OTHER PUBLICATIONS

Notice of Allowance dated Oct. 7, 2020 in U.S. Appl. No. 16/615,681, pp. 2-3.

TELUS Neighbourhood, "Automatic Closed Captions When Audio Muted", last accessed Feb. 13, 2015, pp. 1-5.

Wikipedia, "Closed Captioning", retrieved Sep. 25, 2017, pp. 1-20.

* cited by examiner

METHODS, SYSTEMS, AND MEDIA FOR PRESENTING CAPTION INFORMATION BASED ON VOLUME SETTING ADJUSTMENTS

CROSS-REFERENCE TO RELATED APPLICATIONS

This application is a continuation of U.S. patent application Ser. No. 16/615,681, filed Nov. 21, 2019, which is a United States National Phase Application under 35 U.S.C. § 371 of International Application No. PCT/US2017/066020, filed Dec. 13, 2017, each of which is hereby incorporated by reference herein in its entirety.

TECHNICAL FIELD

The disclosed subject matter relates to methods, systems, and media for presenting caption information based on volume setting adjustments. More particularly, the disclosed subject matter relates to determining that a particular volume setting adjustment has been received while a media playback application playing back a video content item is in a mute state and, in response, transitioning to a caption state in which caption information associated with the video content item can be presented and a volume interface can be updated to contextually indicate the presentation of the caption information.

BACKGROUND

Video content providers can receive uploaded video content, store the uploaded video content, and then provide the uploaded video content to many users, for example, by streaming the video content to multiple user devices that are each executing a media playback application. With the media playback application, these video content providers generally provide menus of options relating to the playback of the video content and/or the input of user preferences. For example, with regard to video captions, a user of a media playback application typically selects the appropriate menu option that opens options relating to the playback of the video content, selects a sub-menu option relating to caption information, and configures the caption options provided in response to selecting the sub-menu option such that video captions for presented video content are always presented on a display. This is a time consuming and difficult procedure for the user. Moreover, this may cause the user to miss a substantial portion of the video captions associated with the video content being presented while turning on a caption feature via this procedure. For example, when performing this procedure during the playback of video content, the user may rewind the video content to a position prior to performing this procedure such that the corresponding video captions can be presented.

Accordingly, it is desirable to provide methods, systems, and media for presenting caption information based on volume setting adjustments.

SUMMARY

Methods, systems, and media for presenting caption information based on volume setting adjustments are provided.

In accordance with some embodiments of the disclosed subject matter, a method for presenting video captions is provided, the method comprising: during playback of a video content item in a media playback application, causing, using a media device that includes a hardware processor, a volume interface that corresponds to the media playback application to be presented, wherein the volume interface includes a lowest volume setting and a caption interface element; determining, using the hardware processor, that a first user selection has been received that causes the volume interface to be at the lowest volume setting of the volume interface; in response to determining that the first user selection has been received, causing, using the hardware processor, the video content item being presented in the media playback application to be in a mute state in which audio content associated with the video content item is muted, updating the volume interface by positioning a highlight region over the lowest volume setting, and presenting a contextual interface element that indicates the mute state of the media playback application; determining, using the hardware processor, that a second user selection has been received that corresponds with decreasing volume of the audio content associated with the video content item while the video content item being presented in the media playback application is in a mute state; and in response to determining that the second user selection has been received, updating, using the hardware processor, the volume interface by positioning the highlight region over the caption interface element, presenting the contextual interface element that indicates a caption state of the media playback application, and causing caption information associated with the video content item to be presented.

In some embodiments, the contextual interface element is presented in a position adjacent to the highlight region and the contextual interface element is inhibited from being presented in response to a predetermined time period elapsing.

In some embodiments, the method further comprises: determining that a third user selection has been received that corresponds with increasing volume of the audio content associated with the video content item while the video content item being presented in the media playback application is in the caption state; and, in response to determining that the third user selection has been received, causing the caption information associated with the video content item to cease being presented, updating the volume interface by positioning the highlight region over the lowest volume setting, and presenting the contextual interface that indicates the caption state of the media playback application in which the caption information will no longer be presented.

In some embodiments, the method further comprises determining that the video content item being presented in the media playback application has been placed in the mute state, wherein the volume interface is automatically updated by positioning the highlight region over the caption interface element, the contextual interface element that indicates the caption state of the media playback application is automatically presented, and the caption information associated with the video content item is automatically presented in response to determining that the video content being presented in the media playback application has been placed in the mute state.

In some embodiments, the method further comprises: determining that the video content item being presented in the media playback application is no longer in the mute state; and automatically causing the caption information associated with the video content item to cease being presented, presenting the contextual interface that indicates the caption state of the media playback application in which the caption information will no longer be presented, and causing the caption information associated with the video content item to cease being presented.

In some embodiments, the method further comprises determining whether the caption information is available for the video content item being played back in the media playback application; and, in response to determining that the caption information is not available for the video content item being played back in the media playback application, causing the caption interface element to be disabled from activation.

In some embodiments, the method further comprises modifying the volume interface by removing the caption interface element in response to determining that the caption information is not available for the video content item being played back in the media playback application.

In some embodiments, the media device includes one or more volume buttons that, when selected, modifies the volume of the media playback application executing on the media device in which the media playback application is playing back the video content item and at least one of the first user selection and the second user selection are received using the one or more volume buttons.

In some embodiments, at least one of the first user selection and the second user selection are received using a touchscreen associated with the media device.

In accordance with some embodiments of the disclosed subject matter, a system for presenting video captions is provided, the system comprising a memory and a hardware processor that, when executing computer-executable instructions stored in the memory, is configured to: during playback of a video content item in a media playback application, cause a volume interface that corresponds to the media playback application to be presented, wherein the volume interface includes a lowest volume setting and a caption interface element; determine that a first user selection has been received that causes the volume interface to be at the lowest volume setting of the volume interface; in response to determining that the first user selection has been received, cause the video content item being presented in the media playback application to be in a mute state in which audio content associated with the video content item is muted, update the volume interface by positioning a highlight region over the lowest volume setting, and present a contextual interface element that indicates the mute state of the media playback application; determine that a second user selection has been received that corresponds with decreasing volume of the audio content associated with the video content item while the video content item being presented in the media playback application is in a mute state; and, in response to determining that the second user selection has been received, update the volume interface by positioning the highlight region over the caption interface element, present the contextual interface element that indicates a caption state of the media playback application, and cause caption information associated with the video content item to be presented.

In accordance with some embodiments of the disclosed subject matter, a non-transitory computer-readable medium containing computer-executable instructions that, when executed by a processor, cause the processor to perform a method for presenting video captions is provided, the method comprising: during playback of a video content item in a media playback application, causing a volume interface that corresponds to the media playback application to be presented, wherein the volume interface includes a lowest volume setting and a caption interface element; determining that a first user selection has been received that causes the volume interface to be at the lowest volume setting of the volume interface; in response to determining that the first user selection has been received, causing the video content item being presented in the media playback application to be in a mute state in which audio content associated with the video content item is muted, updating the volume interface by positioning a highlight region over the lowest volume setting, and presenting a contextual interface element that indicates the mute state of the media playback application; determining that a second user selection has been received that corresponds with decreasing volume of the audio content associated with the video content item while the video content item being presented in the media playback application is in a mute state; and, in response to determining that the second user selection has been received, updating the volume interface by positioning the highlight region over the caption interface element, presenting the contextual interface element that indicates a caption state of the media playback application, and causing caption information associated with the video content item to be presented.

In accordance with some embodiments of the disclosed subject matter, a system for presenting video captions is provided, the system comprising: means for presenting a volume interface that corresponds to the media playback application during playback of a video content item in a media playback application, wherein the volume interface includes a lowest volume setting and a caption interface element; means for determining that a first user selection has been received that causes the volume interface to be at the lowest volume setting of the volume interface; means for presenting the video content item in the media playback application to be in a mute state in which audio content associated with the video content item is muted, means for updating the volume interface by positioning a highlight region over the lowest volume setting, and means for presenting a contextual interface element that indicates the mute state of the media playback application in response to determining that the first user selection has been received; means for determining that a second user selection has been received that corresponds with decreasing volume of the audio content associated with the video content item while the video content item being presented in the media playback application is in a mute state; and means for updating the volume interface by positioning the highlight region over the caption interface element, means for presenting the contextual interface element that indicates a caption state of the media playback application, and means for presenting caption information associated with the video content item in response to determining that the second user selection has been received.

The subject matter described in this specification can be implemented in particular embodiments so as to realize one or more of the following advantages. A more efficient and user-friendly user interface is provided by providing an elegant mechanism for enabling captions for a muted video content item. This avoids the need for the user to access complicated menu structure to enable captions, thereby allowing captions to be turned on more quickly and easily and reducing the computational burden on the media device. As the user does not need to navigate through a menu structure to turn on the captions, the captions can be turned on quickly during playback of the video, avoiding the need for the user to rewind the video to view any missed sections.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
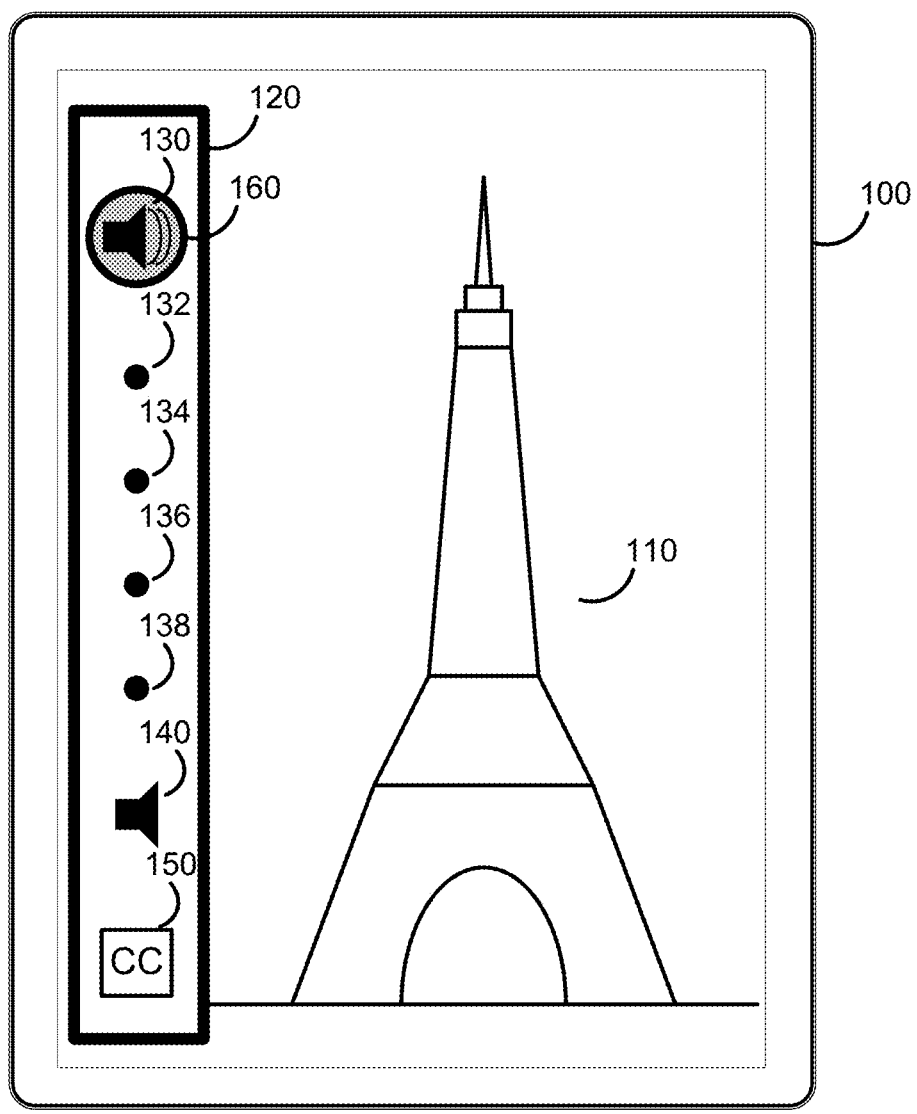
FIG. 1A shows an illustrative example of a volume interface within a media playback application that causes caption information to be presented based on volume setting adjustments in accordance with some embodiments of the disclosed subject matter.

In accordance with various embodiments, mechanisms (which can include methods, systems, and media) for presenting caption information based on volume setting adjustments are provided.

In some embodiments, the mechanisms described herein can present a volume interface as a portion of a media playback application in which a video content item is being played back. For example, a volume interface can include one or more volume indicators and a caption indicator, where the volume interface can be presented within the media playback application for any suitable period of time (e.g., at the initiation of a video content item being played back, in response to receiving a user instruction that interacts with the volume interface, or during the entirety of the video content item being played back). In a more particular example, the volume interface can include multiple volume indicators that indicate a highest volume setting, a lowest volume setting, and any suitable number of intermediate volume settings between the highest volume setting and the lowest volume setting (e.g., one setting, two settings, five settings, ten settings, etc.). In continuing this example, the volume interface can also include a caption interface element that indicates when a caption state has been entered in which caption information associated with the video content item is to be presented.

In some embodiments, the mechanisms described herein can determine that one or more user selections have been received in which the lowest volume setting of the volume interface has been selected. In response to selecting the lowest volume setting of the volume interface, the mechanisms can cause the media playback application to enter a mute state in which audio content associated with the video content item is muted.

It should be noted that user selections can be received from a user of a user device in any suitable manner. For example, a user device can include one or more volume buttons (e.g., an up-volume button, a down-volume button, a volume slider button, etc.) for controlling the volume of audio content being output by the user device. In a more particular example, the one or more volume buttons can be configured to control the volume of the audio content of a media playback application executing on the user device. In another example, the user selections can be received using a touchscreen associated with the user device. In a more particular example, a user of a user device can interact, via a touchscreen, with one or more volume interfaces presented on the user device.

In some embodiments, the mechanisms can update the volume interface by positioning a highlight region over the lowest volume setting. This can, for example, indicate the current selection made by the user of the user device executing the media playback application.

In some embodiments, the mechanisms can update the volume interface by presenting a contextual interface element that indicates the mute state of the media playback application. For example, the mechanisms can present a "MUTE" message adjacent to the lowest volume setting in which the highlight region is positioned over the lowest volume setting. In another example, the contextual interface element (e.g., a "MUTE," "CAPTIONS ON," or "CAPTIONS OFF" message) can be presented for a particular period of time and removed from being presented in response to the period of time elapsing. This can, for example, indicate the result of the current selection made by the user of the user device executing the media playback application (e.g., the last button selection or interface selection on the user device caused the media playback application to enter a mute state).

In some embodiments, the mechanisms described herein can determine that an additional user selection has been received that corresponds with decreasing the volume of the audio content associated with the video content while the video content item being presented in the media playback application is currently in a mute state. In response to receiving this additional user selection (e.g., a down-volume button selection on the user device or a volume interface selection via an interface being presented on the user device), the mechanisms can cause the media playback application to enter a caption state in which caption information associated with the video content item is presented.

In some embodiments, the mechanisms can update the volume interface by positioning the highlight region over the caption interface element. This can, for example, indicate that the current selection made by the user of the user device executing the media playback application caused the media playback application to enter the caption state.

In some embodiments, the mechanisms can update the volume interface by presenting a contextual interface element that indicates the caption state of the media playback application. For example, the mechanisms can present a "CAPTIONS ON" message adjacent to the caption interface element in which the highlight region is currently positioned. This can, for example, indicate the result of the current selection made by the user of the user device executing the media playback application (e.g., the additional user selection of a button press or interface selection on the user device caused the media playback application to enter a caption state.

In some embodiments, the mechanisms can determine that a user selection has been received that corresponds with increasing the volume of the audio content associated with the video content item while the video content item being presented in the media playback application is currently in a caption state. In response to receiving this user selection (e.g., an up-volume button selection on the user device or a volume interface selection via an interface being presented on the user device), the mechanisms can cause the media playback application to enter a mute state in which caption information associated with the video content item is inhibited from being presented. In some embodiments, the mechanisms can continue to mute the audio content associated with the video content item being presented in the media playback application and can update the volume interface to position the highlight region over the lowest volume setting and/or present a contextual interface element that indicates the transition from the caption state to the mute state (e.g., a "CAPTIONS OFF" message).

In some embodiments, the mechanisms described herein can determine whether caption information is available for the video content item being presented in the media playback application. For example, in response to determining that caption information is not available for the video content item, the mechanisms can disable the caption interface element such that the caption interface element cannot be activated by a corresponding button press on the user device (e.g., a down-volume button press) or by a corresponding user interface selection on a touchscreen of the user device. In another example, the determination of whether caption information is available can be made in response to receiving a corresponding user selection when the media playback application is in a mute state (e.g., the lowest volume setting has been selected) and, in response to receiving a subsequent user selection, the mechanisms can disable the caption interface element and/or present a contextual interface element indicating that caption information is not available (e.g., a "NO CAPTIONS" message).

In some embodiments, the mechanisms described herein can allow the caption interface element to be selected (e.g., via a touchscreen of the user device) independently from the volume settings. For example, in response to adjusting the volume of the audio content being presented by the media playback application, the mechanisms can detect a user selection of the caption interface element and, in response, the mechanisms can cause the media playback application to enter a caption state in which caption information associated with the video content item is presented, can update the volume interface to position a highlight region over the currently selected volume setting and the caption interface element, and/or can update the volume interface to present a contextual interface elements that indicates the caption state of the media playback application (e.g., a "CAPTIONS ON" message adjacent to the caption interface element).

These mechanisms can, for example, allow a user of a user device that is playing back a video content item using a media playback application to enable or disable the presentation of caption information associated with the video content item.

Turning to FIG. 1A, an illustrative example of a user interface in which a video content item is being presented, where a volume interface is presented within the user interface, is shown in accordance with some embodiments of the disclosed subject matter. In some embodiments, a media playback application can be executed by a user device 100 (e.g., a mobile phone, a tablet computer, a laptop computer, a desktop computer, a media player, and/or any other suitable type of user device). The media playback application executing on user device 100 can present a video content item 110 and, in some embodiments, a volume interface 120.

It should be noted that, during the playback of video content item 110, volume interface 120 can be presented at any suitable time. For example, as shown in FIG. 1A, volume interface 120 can include one or more volume indicators 130-140 and a caption indicator 150, where volume interface 120 can be presented within the media playback application for any suitable period of time, such as at the initiation of video content item 110 being played back and in response to receiving a user instruction that interacts with volume interface 120. Alternatively, in another example, volume interface 120 that includes one or more volume indicators 130-140 and caption indicator 150 can be presented during the entirety of video content item 110 being played back in the media playback application or during the entirety of the media playback application being executed on user device 100.

Figure 1B:
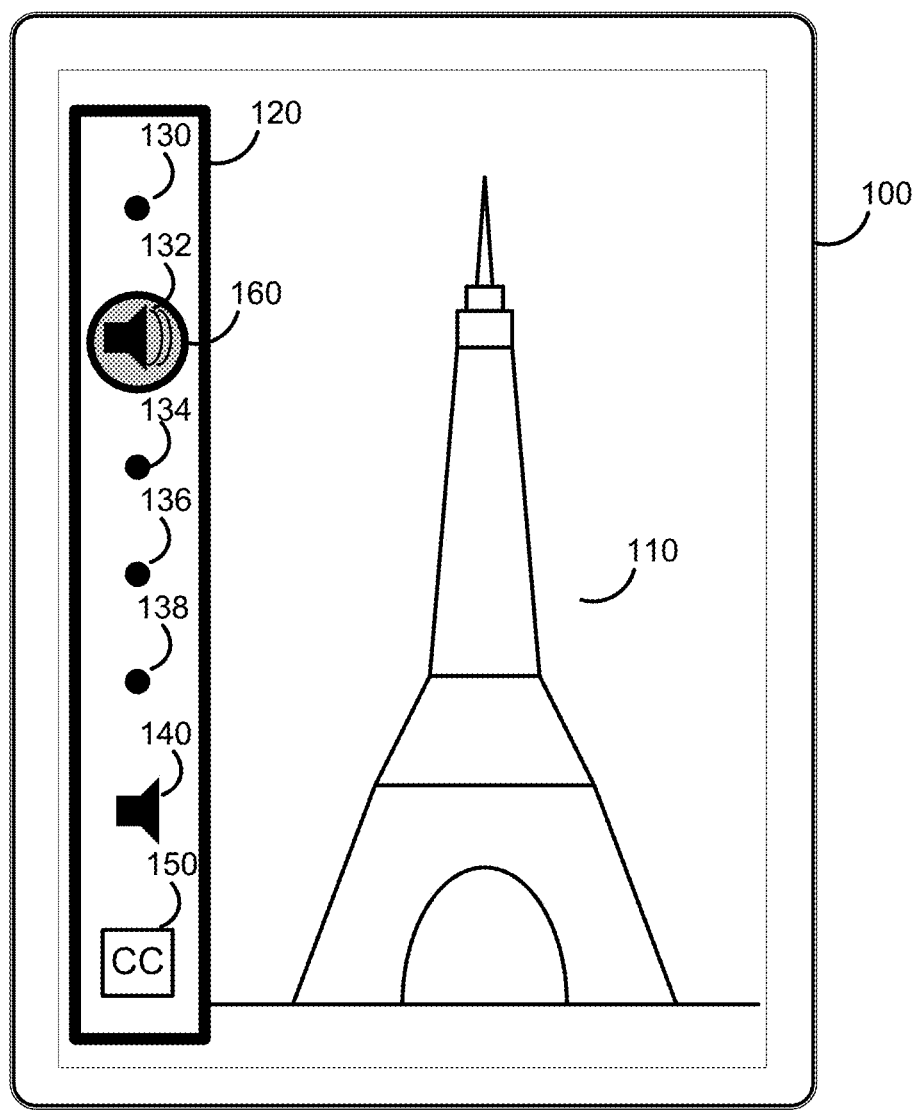
FIG. 1B shows an illustrative example of a volume interface within a media playback application that causes caption information to be presented based on volume setting adjustments, where a user selection has been received that causes the volume to be decreased, in accordance with some embodiments of the disclosed subject matter.
Figure 1C:
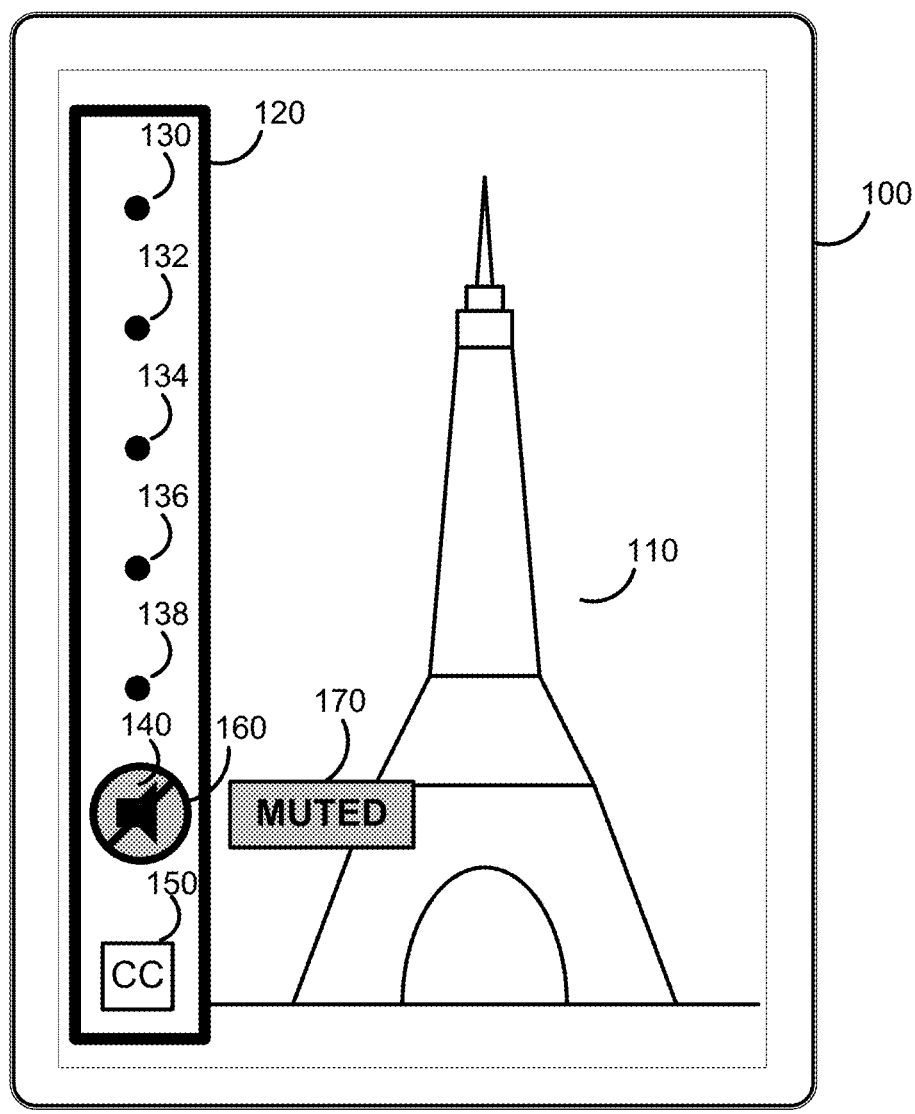
FIG. 1C shows an illustrative example of a volume interface within a media playback application that causes caption information to be presented based on volume setting adjustments, where one or more user selections have been received that causes the media playback application to enter a mute state, in accordance with some embodiments of the disclosed subject matter.

As illustrated, one or more volume indicators 130-140 can be included within volume interface 120 in any suitable manner. For example, as shown in FIG. 1A, volume indicator 130 can be used to represent a highest volume setting and volume indicator 140 can be used to represent a lowest volume setting (e.g., a mute setting), where volume indicators 132, 134, 136, and 138 can represent intermediate volume settings between the highest volume setting and the lowest volume setting (e.g., 20%, 40%, 60%, and 80% of the highest volume setting, respectively). In a more particular example, as shown in FIG. 1A, the user has currently selected the highest volume setting of volume interface 120 as represented by volume indicator 130. In another more particular example, as shown in FIG. 1B, in response to the user of user device 100 decreasing the volume of the audio content by one volume increment, the user has currently selected an intermediate volume setting of volume interface 120 as represented by volume indicator 132. In yet another example, as shown in FIG. 1C, in response to the user of user device 100 decreasing the volume of the audio content to the lowest volume setting (e.g., a mute state), the user has currently selected the lowest volume setting of volume interface 120 as represented by volume indicator 140.

Figure 1D:
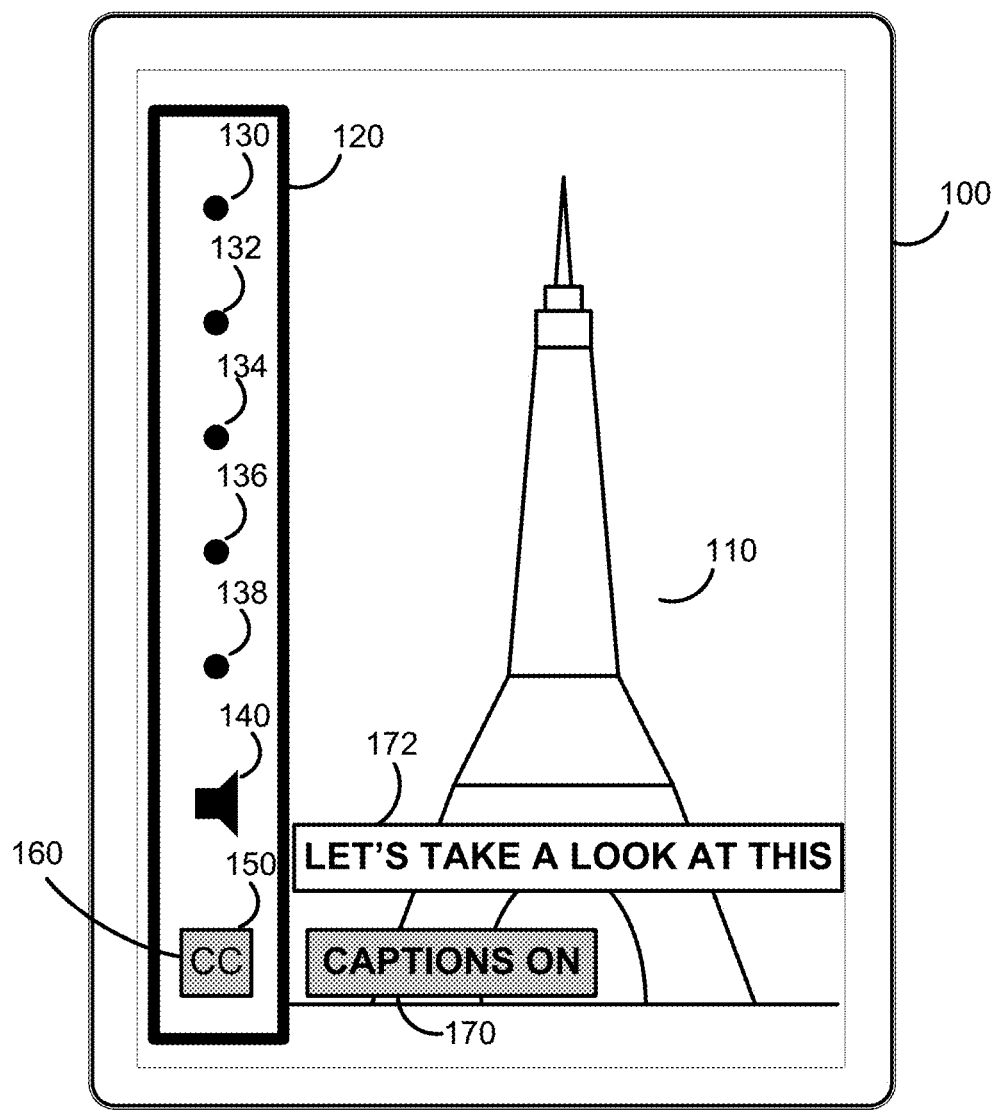
FIG. 1D shows an illustrative example of a volume interface within a media playback application that causes caption information to be presented based on volume setting adjustments, where a user selection has been received to decrease the volume of the video content item being presented in the media playback application that is currently in a mute state and where a caption state has been entered in which caption information associated with the video content item is presented, that causes in accordance with some embodiments of the disclosed subject matter.

It should be noted, however, that any suitable volume indicators can be presented. For example, as shown in FIGS. 1G and 1H, alternative volume interfaces 190 and 195, respectively, can be presented in which volume can be indicated within a volume slider interface or in which volume can be indicated in different orientations.

In some embodiments, volume interface 120 can include a highlight region 160 that is positioned within volume interface 120 to indicate the current selection by a user of user device 100. For example, as shown in FIG. 1A, the user has currently selected the highest volume setting of volume interface 120 and, in response, highlight region 160 can be positioned over volume indicator 130. In another example, as shown in FIG. 1B, in response to the user of user device 100 decreasing the volume of the audio content by one volume increment, highlight region 160 can be positioned over volume indicator 132. In yet another example, as shown in FIG. 1C, in response to the user of user device 100 decreasing the volume of the audio content to the lowest volume setting (e.g., a mute state), highlight region 160 can be positioned over volume indicator 140. In a further example, as shown in FIG. 1D, in response to the user of user device 100 continuing to provide an indication to decrease the volume of the audio content when the media playback application presenting video content item 110 is currently in a mute state, highlight region 160 can be positioned over caption indicator 150. Alternatively to highlight region 160, any suitable approach can be used to highlight the current selection by a user of user device 100 (e.g., color change, icon modification, etc.).

In some embodiments, volume interface 120 can include caption indicator 150. As described herein, in response to determining that a user selection has been received that corresponds with decreasing the volume of the audio content associated with video content item 110 while video content item 110 being presented in the media playback application is currently in a mute state, a caption state can be activated in which caption information associated with the video content item is presented and caption indicator 150 can be highlighted (e.g., with highlight region 160) to indicate the activation of the caption state.

Additionally or alternatively, in some embodiments, caption indicator 150 can be activated independently from volume settings, such as those represented by volume indicators 130-140. For example, in some embodiments, in response to selecting caption indicator 150 while the volume of the audio content associated with the video content item is not currently in a mute state (e.g., using a touchscreen to select caption indicator 150 while the volume is not at the lowest volume setting), a caption state can be activated in which caption information associated with the video content item is presented along with the audio content at the currently selected volume setting and caption indicator 150 can be highlighted to indicate the activation of the caption state (e.g., along with a highlight region positioned over the currently selected volume setting).

In some embodiments, caption indicator 150 can be de-activated or otherwise placed in an inactive state in response to determining that caption information is not available for a video content item being presented in the media playback application. For example, as shown in FIG. 1F, a video content item 180 is presented by the media playback application executing on user device 100 and, in response to determining that caption information is not available for video content item 180, volume interface 120 can be updated by disabling caption indicator 150. In a more particular example, caption indicator 150 has been replaced with caption indicator 182 to indicate that caption information is not available for video content item 180. Accordingly, in response to receiving a user selection of caption indicator 150 or in response to receiving the corresponding user selections to activate a caption state, no caption information can be presented for video content item 180.

It should be noted that user selections of volume indicators 130-140 and caption indicator 150 can be received from a user of user device 100 in any suitable manner. For example, user device 100 can include one or more volume buttons (e.g., an up-volume button, a down-volume button, a volume slider button, etc.) for controlling the volume of audio content being output by user device 100. In a more particular example, the one or more volume buttons can be configured to control the volume of the audio content of a media playback application executing on user device 100. In another example, the user selections can be received using a touchscreen associated with user device 100. In a more particular example, a user of user device 100 can interact, via a touchscreen, with one or more volume interfaces presented on user device 100.

In some embodiments, volume interface 120 can include one or more contextual interface elements 170. Contextual interface elements 170 can be presented in connection with volume interface 120 to indicate a state change of volume interface 120. For example, contextual interface element 170 can be presented to indicate the transition from a mute state to a caption state. In another example, contextual interface element 170 can be presented to indicate the transition to a caption state while audio content continues to be presented. In yet another example, contextual interface element 170 can be presented to indicate the transition from a caption state to a mute state in which audio continues to be muted and in which caption information is no longer presented.

In a more particular example, as shown in FIG. 1C, in response to determining that one or more user selections have been received in which the lowest volume setting of volume interface 120 has been selected, the media playback application can enter a mute state in which audio content associated with video content item 110 is muted. In continuing this example, volume interface 120 can be updated by presenting contextual interface element 170 that indicates the mute state of the media playback application—e.g., a "MUTE" message adjacent to the lowest volume setting 140 in which highlight region 160 is positioned over lowest volume setting 140.

In another more particular example, as shown in FIG. 1D, in response to determining that a user selection corresponding with a decrease in volume has been received in which the media playback application is currently in a mute state (e.g., already at the lowest volume setting), the media playback application can enter a caption state in which caption information 172 associated with video content item 110 can be presented. In continuing this example, volume interface 120 can be updated by presenting contextual interface element 170 that indicates the caption state of the media playback application—e.g., a "CAPTIONS ON" message adjacent to caption indicator 150 in which highlight region 160 is positioned over caption indicator 150.

In instances in which it is determined that caption information is not available for video content item 110 being presented in the media playback application (e.g., in response to selecting video content item 110 for playback, in response to receiving the user selection corresponding with a decrease in volume while the media playback application is currently in a mute state, etc.), volume interface can be updated by disabling the caption interface element and/or presenting contextual interface element 170 that indicates caption information, such as caption information 172, is not available—e.g., a "NO CAPTIONS" message adjacent to caption indicator 150 in which highlight region remains positioned over lowest volume setting 140.

Figure 1E:
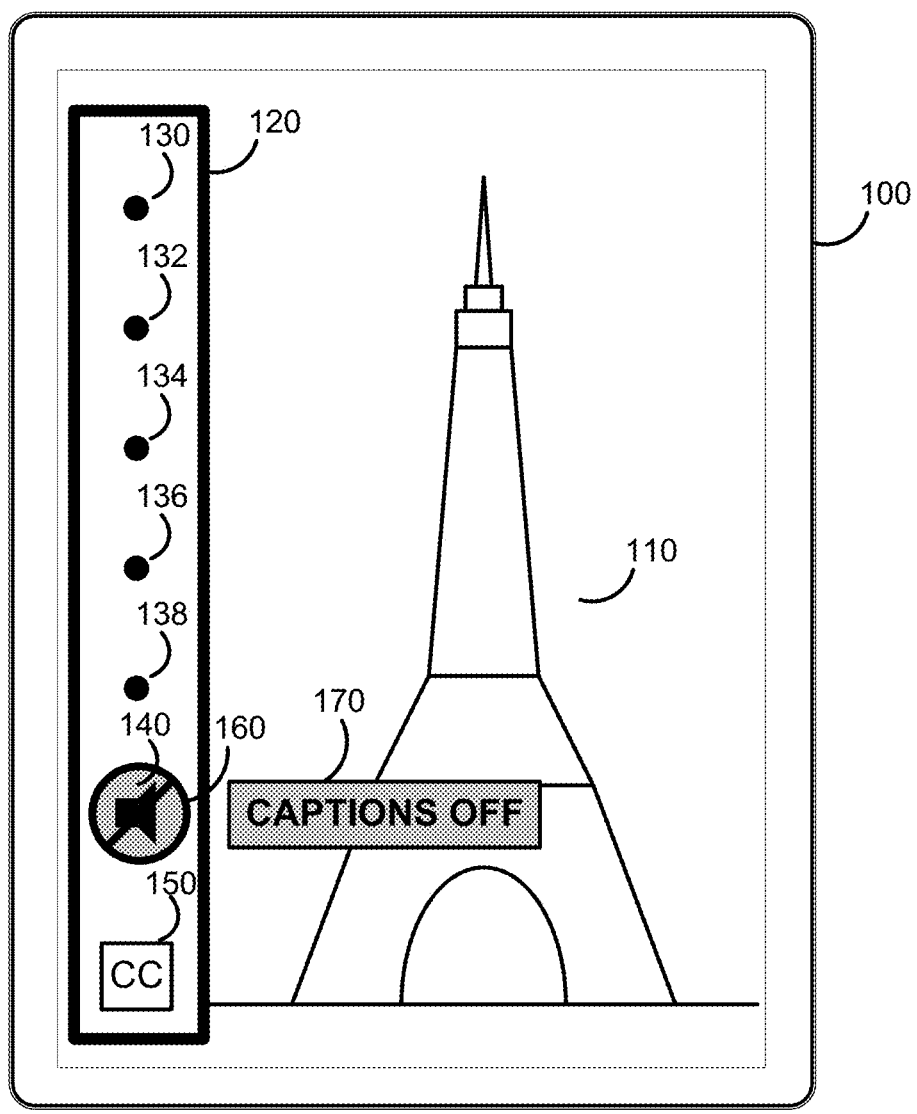
FIG. 1E shows an illustrative example of a volume interface within a media playback application that causes caption information to be presented based on volume setting adjustments, where a user selection has been received to increase the volume of the video content item being presented in the media playback application that is currently in a caption state in which a transition from the caption state to a mute state is caused, in accordance with some embodiments of the disclosed subject matter.
Figure 1F:
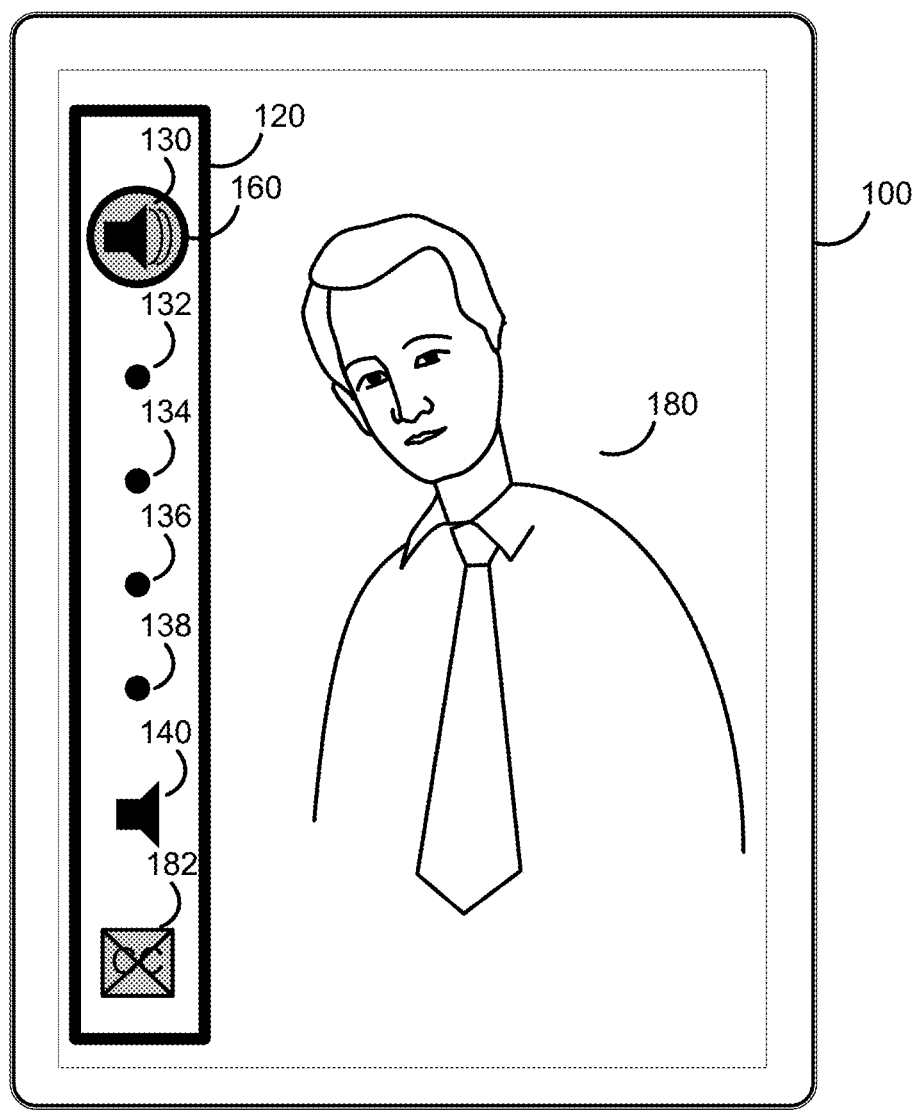
FIG. 1F shows an illustrative example of a volume interface within a media playback application that causes caption information to be presented based on volume setting adjustments, where a caption interface element in the volume interface is in an inactive state in response to determining that caption information for the video content item is not available, in accordance with some embodiments of the disclosed subject matter.
Figure 1G:
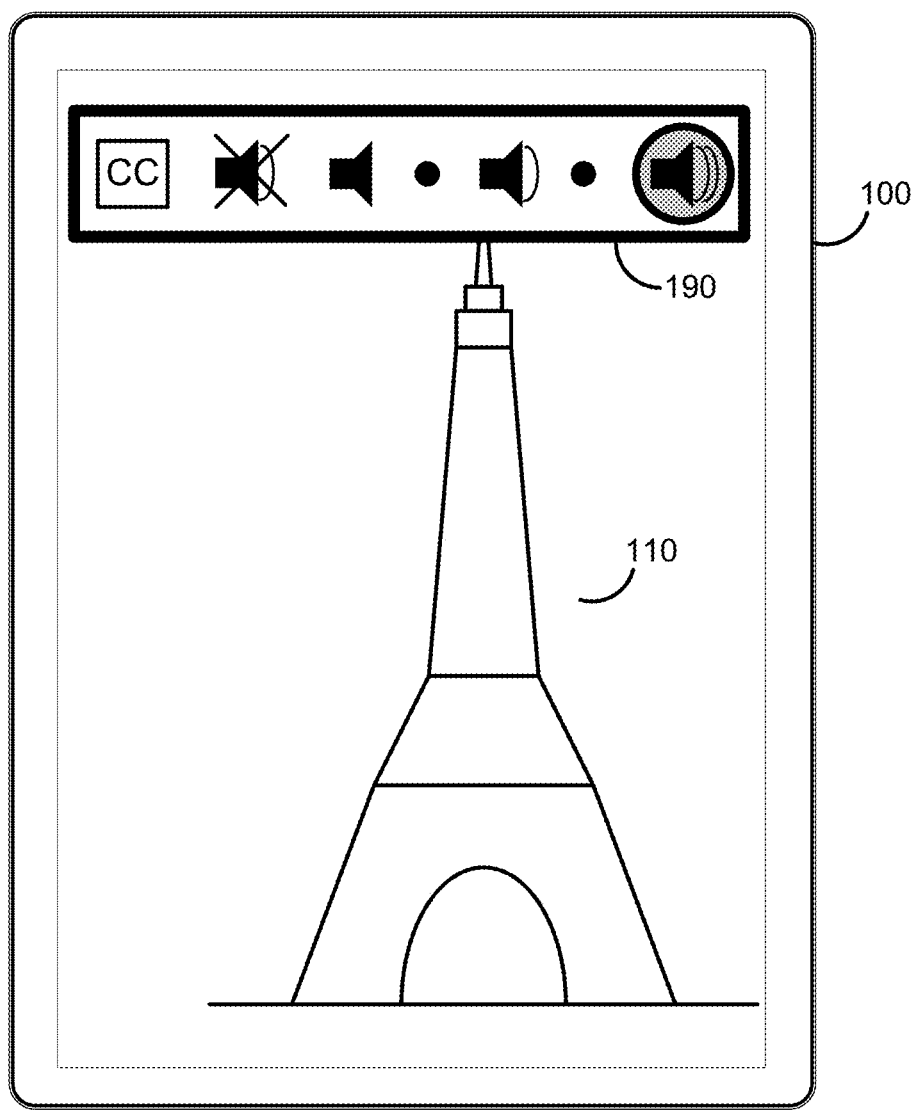
FIGS. 1G and 1H shows illustrative examples of alternative volume interfaces within a media playback application that causes caption information to be presented based on volume setting adjustments in accordance with some embodiments of the disclosed subject matter.
Figure 1H:
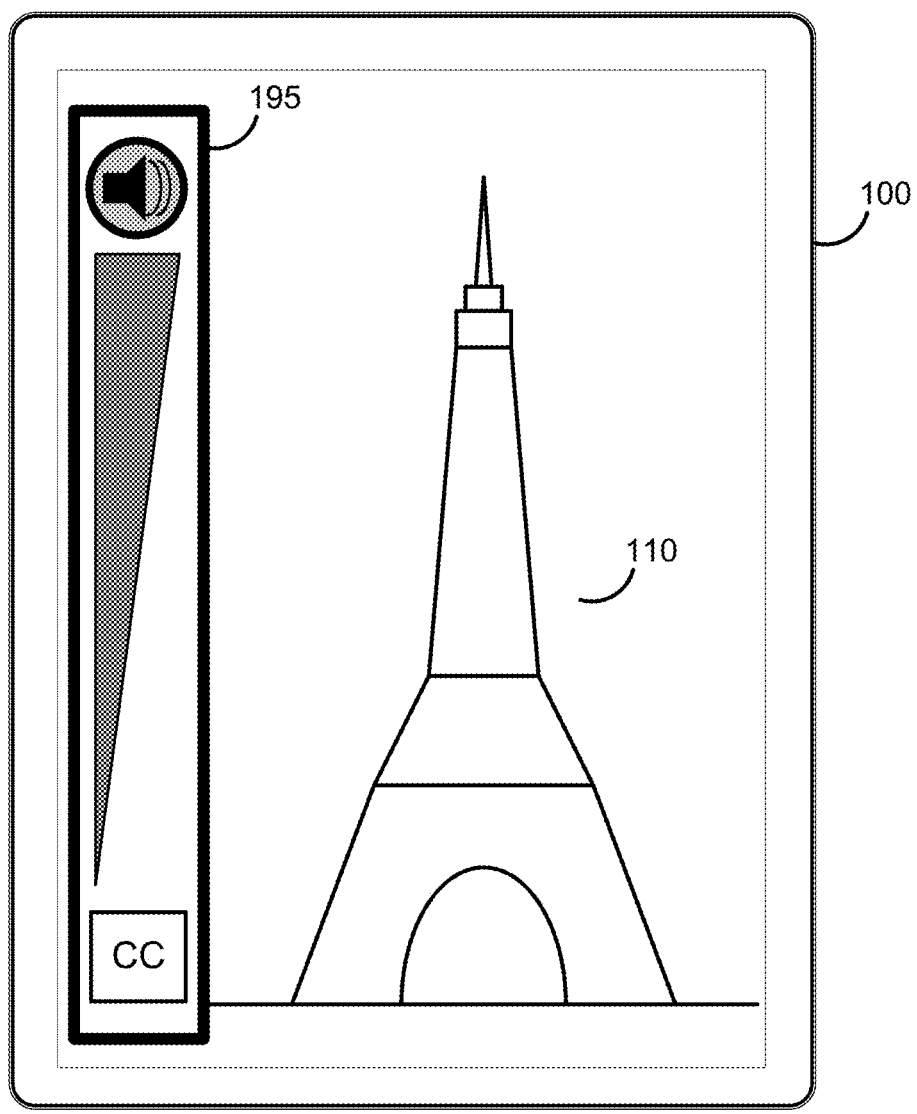

In yet another more particular example, as shown in FIG. 1E, in response to determining that a user selection corresponding with an increase in volume has been received in which the media playback application is currently in a caption state (e.g., presenting caption information 172 associated with video content item 110), the media playback application can enter a mute state in which caption information 172 associated with the video content item 110 is inhibited from being presented. In continuing this example, the audio content associated with video content item 110 can continue to be muted and volume interface 120 can be updated by presenting contextual interface element 170 that indicates the transition from the caption state to the mute state—e.g., a "CAPTIONS OFF" message adjacent to caption indicator 150 in which highlight region is positioned over lowest volume setting 140.

FIGS. 1G and 1H shows illustrative examples of alternative volume interfaces within a media playback application that causes caption information to be presented based on volume setting adjustments in accordance with some embodiments of the disclosed subject matter. For example, FIG. 1G shows a volume interface 190 that is presented in a horizontal bar positioned within an upper region of the media playback application. In another example, FIG. 1H shows a volume interface 190 that includes a volume slider indicator that shows a current volume setting in the media playback application.

Figure 2:
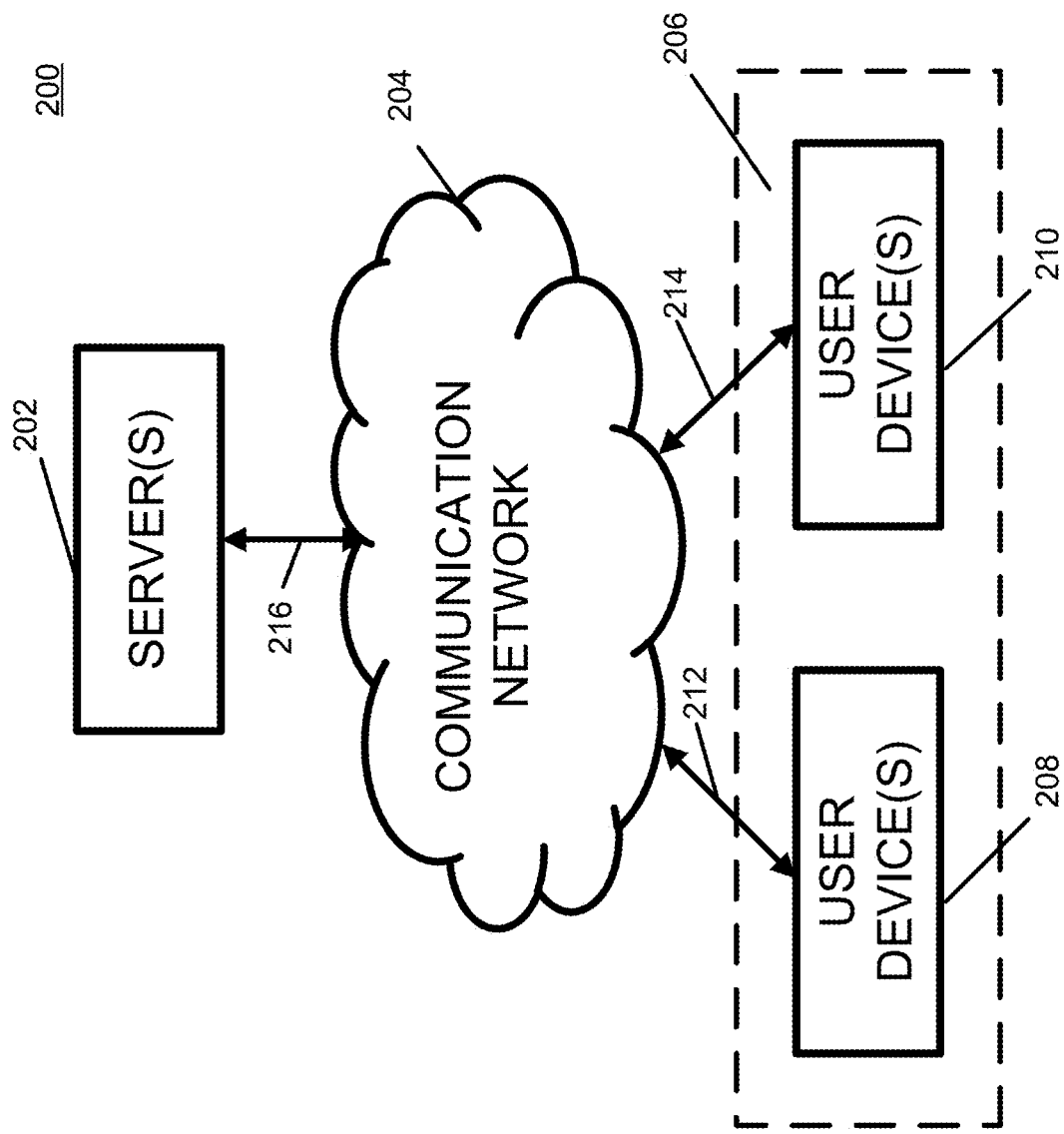
FIG. 2 shows a schematic diagram of an illustrative system suitable for implementation of mechanisms described herein for presenting caption information based on volume setting adjustments in accordance with some embodiments of the disclosed subject matter.

Turning to FIG. 2, an example of an illustrative system 200 suitable for implementation of mechanisms described herein for presenting caption information based on volume setting adjustments is shown in accordance with some embodiments of the disclosed subject matter is shown. As illustrated, hardware 200 can include one or more servers, such as a server 202, a communication network 204, and/or one or more user devices 206, such as user devices 208 and 210.

In some embodiments, server(s) 202 can be any suitable server(s) for transmitting a video content item for presentation on one or more user devices 206, determining whether caption information is available for a video content item, etc. In some embodiments, server(s) 202 can be omitted.

Communication network 204 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 and/or 214 to communication network 204 that can be linked via one or more communications links (e.g., communications link 216) to server(s) 202. Communications links 212, 214, and/or 216 can be any communications links suitable for communicating data among user devices 306 and server(s) 202 such as network links, dial-up links, wireless links, hard-wired links, any other suitable communications links, or any suitable combination of such links.

In some embodiments, user devices 206 can include one or more computing devices suitable for requesting a video content item from server(s) 202, receiving user selections (e.g., volume selections, caption selections, etc.), entering a mute state in which audio content associated with a video content item is muted, entering a caption state in which caption information associated with a video content item is presented in response to a selection of a caption interface element or in response to a user selection when the media playback application is in a mute state, determining whether caption information is available for a video content item, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 306 can be implemented as a non-mobile device such as a desktop computer, a set-top box, a television, a streaming media player, a game console, and/or any other suitable non-mobile device.

Although server 202 is illustrated as a single device, the functions performed by server 202 can be performed using any suitable number of devices in some embodiments. For example, in some embodiments, multiple devices can be used to implement the functions performed by server 202. In a more particular example, a first server can be used to transmit video content items in response to requests, a second server can be used to store caption information associated with one or more video content items, and a third server can be used to determine whether caption information for a selected video content item is available (e.g., such that a caption interface element is activated or disabled).

Although two user devices 208 and 210 are shown in FIG. 2, any suitable number of user devices, and/or any suitable types of user devices, can be used in some embodiments.

Figure 3:
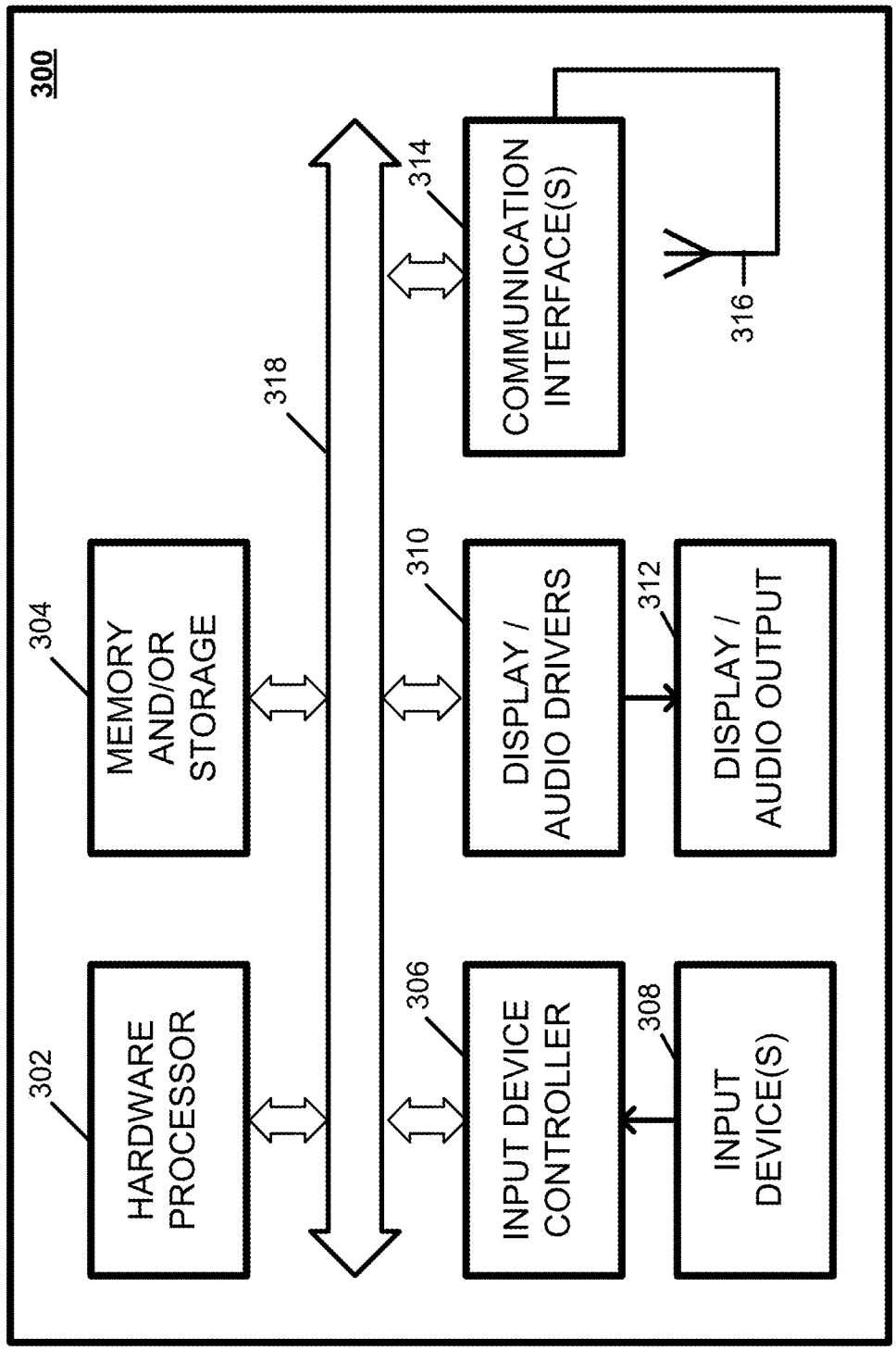
FIG. 3 shows a detailed example of hardware that can be used in a server and/or a user device of FIG. 2 in accordance with some embodiments of the disclosed subject matter.

Server(s) 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, message interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server 202). For example, the server program can cause hardware processor 302 to determine whether caption information is associated with a video content item that is current being played back or that has been requests for playback. In some embodiments, hardware process 302 can be controlled by a media playback application stored in memory and/or storage 304 of a user device (e.g., such as user device 206). For example, the media playback application can cause hardware process 302 to detect whether one or more user selections have been received (e.g., via input device controller 306 or input device 308), determine whether to enter a mute state, determine whether to transition from a mute state to a caption state, determine whether caption information is available for a video content item being presented, and/or present volume interfaces and components of the volume interfaces (e.g., one or more volume indicators, one or more caption interface elements, one or more contextual interface elements, etc.).

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. In a more particular example, input device controller 406 can be circuitry for receiving input from an up-volume button, a down-volume button, and/or a volume slider button. In another more particular example, input device controller 406 can be circuitry for receiving inputs associated with volume settings or caption activation or deactivation from a touchscreen. In another example, input device controller 406 can be circuitry for receiving input from a head-mountable device (e.g., for presenting virtual reality content or augmented reality content).

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
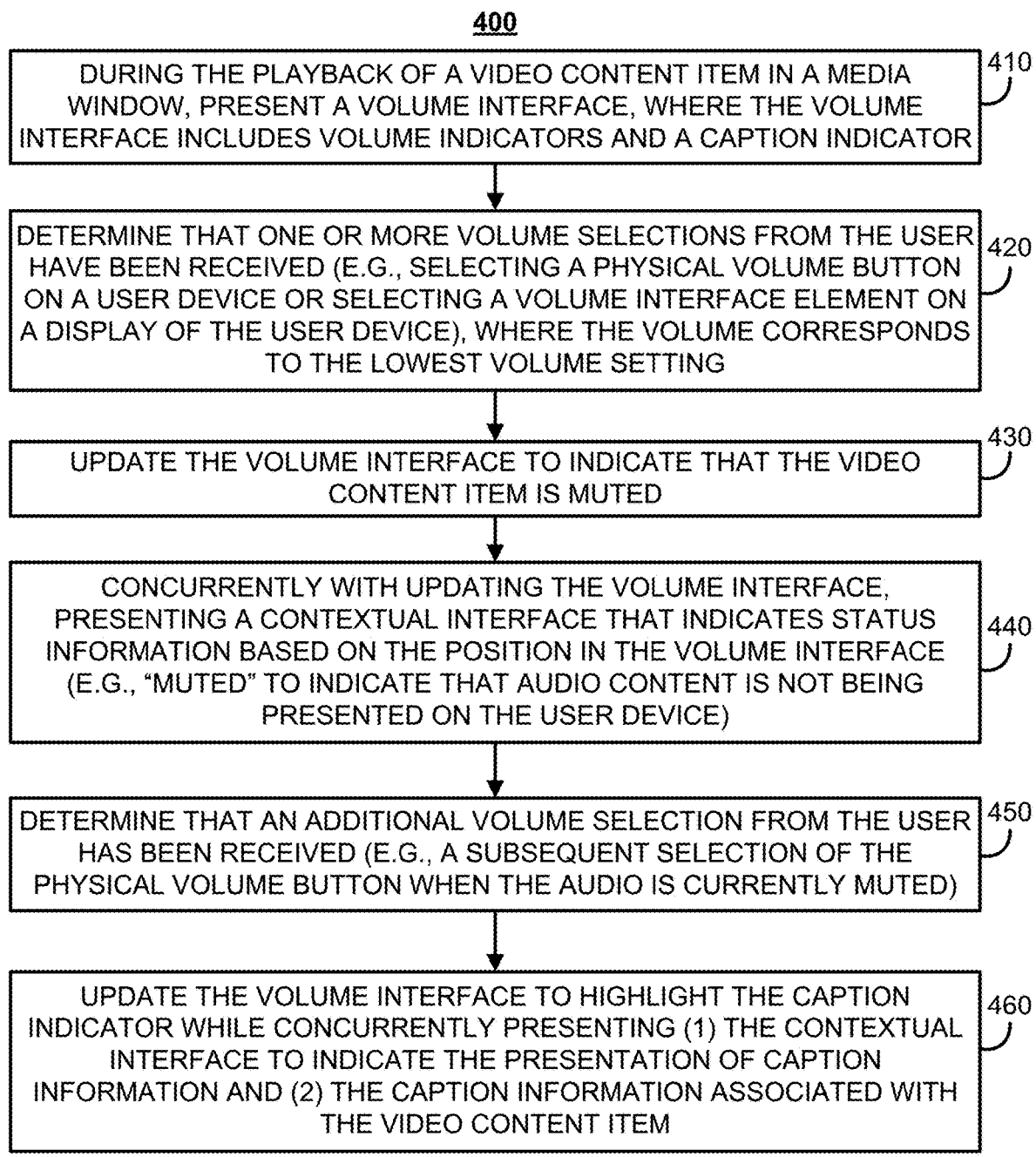
FIG. 4 shows an illustrative example of a process for presenting a volume interface and caption information based on volume setting adjustments in accordance with some embodiments of the disclosed subject matter.

Turning to FIG. 4, an illustrative example 400 of a process for generating and executing one or more query-transforms in connection with video content items is shown in accordance with some embodiments of the disclosed subject matter. In some embodiments, blocks of process 500 can be executed on server(s) 302.

FIG. 4 shows an illustrative example of a process for presenting a volume interface and caption information based on volume setting adjustments in accordance with some embodiments of the disclosed subject matter.

Process 400 can begin by presenting a video content item in a media window of a media playback application executing on a user device, where the media window can include a volume interface that has one or more volume indicators and a caption indicator, at 410.

It should be noted that the volume interface can be presented at any suitable time. For example, as shown in FIG. 1A, volume interface 120 can include one or more volume indicators 130-140 and a caption indicator 150, where volume interface 120 can be presented within the media playback application for any suitable period of time, such as at the initiation of video content item 110 being played back and in response to receiving a user instruction that interacts with volume interface 120. Alternatively, in another example, volume interface 120 that includes one or more volume indicators 130-140 and caption indicator 150 can be presented during the entirety of video content item 110 being played back in the media playback application or during the entirety of the media playback application being executed on the user device.

It should also be noted that the one or more volume indicators and the caption indicator included within the volume interface can be presented in any suitable manner. For example, as shown in FIG. 1A, volume indicator 130 can be used to represent a highest volume setting and volume indicator 140 can be used to represent a lowest volume setting (e.g., a mute setting), where volume indicators 132, 134, 136, and 138 can represent intermediate volume settings between the highest volume setting and the lowest volume setting (e.g., 20%, 40%, 60%, and 80% of the highest volume setting, respectively). In a more particular example, as shown in FIG. 1A, the user has currently selected the highest volume setting of volume interface 120 as represented by volume indicator 130. In another more particular example, as shown in FIG. 1B, in response to the user of user device 100 decreasing the volume of the audio content by one volume increment, the user has currently selected an intermediate volume setting of volume interface 120 as represented by volume indicator 132. In yet another example, as shown in FIG. 1C, in response to the user of user device 100 decreasing the volume of the audio content to the lowest volume setting (e.g., a mute state), the user has currently selected the lowest volume setting of volume interface 120 as represented by volume indicator 140.

It should be noted, however, that any suitable volume indicators can be presented. For example, as shown in FIGS. 1G and 1H, alternative volume interfaces 190 and 195, respectively, can be presented in which volume can be indicated within a volume slider interface or in which volume can be indicated in different orientations.

In some embodiments, the presentation of volume interface can be configured by a user of a user device executing the media playback application. For example, user preferences can be set that indicate a preference to cause a caption state to be entered in response to receiving an input to decrease the volume of the media playback application while the media playback application is in a mute state. In another example, the media playback application can be initially configured to cause a caption state to be entered in response to receiving an input to decrease the volume of the media playback application while the media playback application is in a mute state and user preferences can be received that disable the above-mentioned caption state. In yet another example, the media playback application can require that authorization from a user of a user device be received that causes a caption state to be entered in response to receiving an input to decrease the volume of the media playback application while the media playback application is in a mute state. In a further example, the volume interface can be presented in a preferred orientation (e.g., as a horizontal bar positioned in an upper portion or a lower portion of a media window as opposed to a vertical bar shown in FIGS. 1A-1F).

In some embodiments, the volume interface can include a caption indicator. For example, in response to determining that a user selection has been received that corresponds with decreasing the volume of the audio content associated with the video content item while the video content item being presented in the media playback application is currently in a mute state, a caption state can be activated in which caption information associated with the video content item is presented and the caption indicator can be highlighted to indicate the activation of the caption state.

Additionally or alternatively, in some embodiments, the caption indicator can be activated independently from volume setting adjustments. For example, in some embodiments, in response to selecting the caption indicator while the volume of the media playback application (or the audio content associated with the video content item) is not currently in a mute state (e.g., using a touchscreen to select the caption indicator while the volume is not at the lowest volume setting), a caption state can be activated in which caption information associated with the video content item is presented along with the audio content at the currently selected volume setting and the caption indicator can be highlighted to indicate the activation of the caption state (e.g., along with a highlight region positioned over the currently selected volume setting).

It should be noted that user selections of the one or more volume indicators and the caption indicator can be received from a user of a user device in any suitable manner. For example, a user device can include one or more volume buttons (e.g., an up-volume button, a down-volume button, a volume slider button, etc.) for controlling the volume of audio content being output by the user device. In a more particular example, the one or more volume buttons can be configured to control the volume of the audio content of a media playback application executing on a user device. In another example, the user selections can be received using a touchscreen associated with a user device. In a more particular example, a user of a user device can interact, via a touchscreen, with one or more volume interfaces presented on the user device.

At 420, process 400 can determine that one or more volume selections from the user have been received, where the lowest volume setting has been selected. For example, one or more volume buttons have been selected that can cause the lowest volume setting to be selected. In another example, a touch can be detected on a portion of a touchscreen of a user device at a location that corresponds to a mute button, a command can be sent to the user device to inhibit audio from being presented or can cause audio to be present if audio presentation is currently inhibited (e.g., in response to a mute command being previous received).

At 430, in response to determining that the lowest volume setting has been selected, process 400 can cause the media playback application to enter a mute state in which audio content associated with the video content item is muted and can update the volume interface to indicate that the video content item is muted. For example, as shown in FIG. 1C, in response to the user of the user device decreasing the volume of the audio content to the lowest volume setting (e.g., a mute state), highlight region 160 can be positioned over volume indicator 140.

In some embodiments, at 440, concurrently with updating the volume interface to indicate that the video content item is in a mute state, process 440 can present one or more contextual interface elements that indicate status information (e.g., a status change) of the volume interface. For example, as shown in FIG. 1C, in response to determining that one or more user selections have been received in which the lowest volume setting of volume interface 120 has been selected, the media playback application can enter a mute state in which audio content associated with video content item 110 is muted. In continuing this example, volume interface 120 can be updated by presenting contextual interface element 170 that indicates the mute state of the media playback application—e.g., a "MUTE" message adjacent to the lowest volume setting 140 in which highlight region 160 is positioned over lowest volume setting 140.

In some embodiments, the contextual interface elements that indicate status information of the volume interface can be presented for any suitable amount of time. For example, the contextual interface element shown in FIG. 1C can presented for a predetermined period of time (e.g., fifteen seconds). In another example, the contextual interface element shown in FIG. 1C can be presented until a subsequent user selection is received.

In some embodiments, at 450, process 400 can determine that an additional volume selection from the user has been received. For example, a subsequent volume button to decrease the volume of the audio content has been selected while the media playback application is currently in a mute state in which the audio content is muted. In another example, a subsequent user input using a touchscreen can be received while the media playback application is currently in a mute state.

In some embodiments, at 460, in response to determining that the additional volume selection has been received while the media playback application is in a mute state, process 400 can cause the media playback application to enter a caption state in which audio content associated with the video content item can continue to be muted, the volume interface can be updated to indicate that the media playback application has transitions from the mute state to the caption state (e.g., by highlighting the caption interface element), the contextual interface element can be updated to indicate the presentation of caption information (e.g., a "CAPTIONS ON" message), and the caption information associated with the video content item can be presented.

For example, as shown in FIG. 1D, in response to the user of the user device continuing to provide an indication to decrease the volume of the audio content when the media playback application presenting the video content item is currently in a mute state, a highlight region can be positioned over the caption indicator. As also shown in FIG. 1D, the volume interface can be updated by presenting a contextual interface element that indicates the caption state of the media playback application—e.g., a "CAPTIONS ON"

message adjacent to the caption indicator in which a highlight region is positioned over the caption indicator.

It should be noted that additional user selections can be received. For example, as shown in FIG. 1E, in response to determining that a user selection corresponding with an increase in volume has been received in which the media playback application is currently in a caption state, process 400 can cause the media playback application to re-enter a mute state in which the caption information associated with the video content item is inhibited from being presented. In continuing this example, the audio content associated with the video content item can continue to be muted and the volume interface can be updated by presenting a contextual interface element that indicates the transition from the caption state to the mute state—e.g., a "CAPTIONS OFF" message adjacent to the caption indicator in which a highlight region is positioned over the lowest volume setting.

In some embodiments, process 400 can determine that caption information is not available for the video content item being presented in the media playback application. It should be noted that this determination can be made at any suitable time. For example, the determination of whether caption information is available can be made in response to selecting the video content item for playback. In another example, the determination of whether caption information is available can be made in response to receiving the user selection corresponding with a decrease in volume while the media playback application is currently in a mute state. In response to determining that caption information is not available, the volume interface can be updated by disabling the caption interface element and/or presenting a contextual interface element that indicates the caption information is not available—e.g., a "NO CAPTIONS" message adjacent to the caption indicator in which a highlight region remains positioned over the lowest volume setting.

Figure 5:
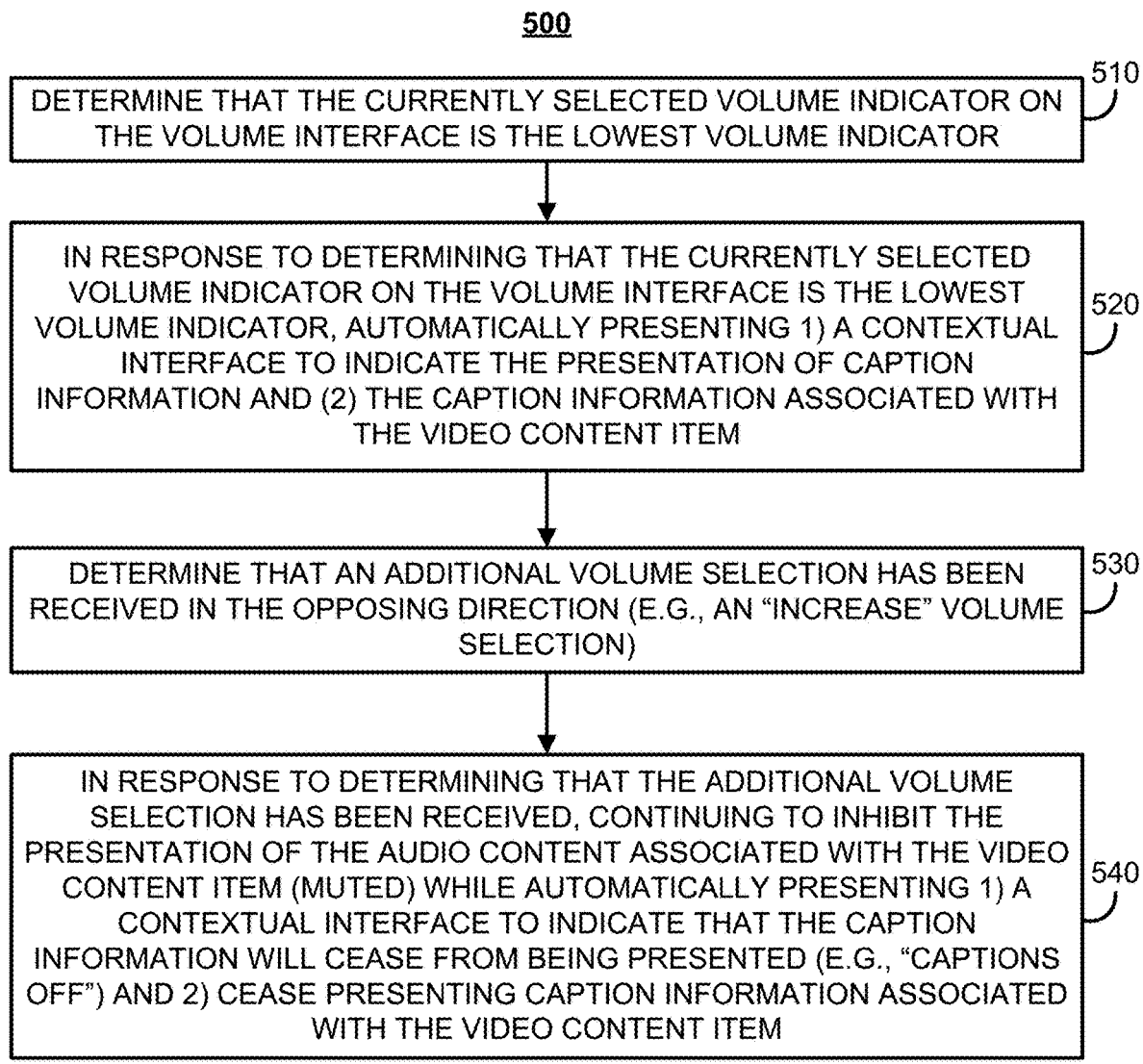
FIG. 5 shows an illustrative example of a process for automatically determining whether to present caption information based on detected volume setting adjustments in accordance with some embodiments of the disclosed subject matter.

FIG. 5 shows an illustrative example of a process for automatically determining whether to present caption information based on detected volume setting adjustments in accordance with some embodiments of the disclosed subject matter.

In some embodiments, process 500 can begin by determining that one or more volume selections from the user have been received, where the lowest volume setting has been selected. For example, one or more volume buttons have been selected that can cause the lowest volume setting to be selected. In another example, a user input using a touchscreen can be received that cause the lowest volume setting to be selected.

In some embodiments, process 500 can determine that a user setting or user preference has been received indicating that automatic transition to a caption state can be performed in response to detecting a particular state of the media playback application.

At 520, in response to determining that the currently selected volume indicator on the volume interface is the lowest volume setting and/or that the media playback application is currently in a mute state, process 500 can automatically present a contextual interface to indicate the transition from the mute state to a caption state and indicate the presentation of caption information and can automatically begin presenting the caption information associated with the video content item (corresponding to the particular location of the video content item).

At 530, process 500 can determine that an additional volume selection from the user has been received that corresponds with increase the volume of the audio content associated with a video content item (or the volume of the media playback application). For example, process 500 can detect that an increase volume button has been selected.

At 540, in response to determining that the additional volume selection has been received while the media playback application is in a caption state, process 400 can continue to inhibit the presentation of the audio content (e.g., mute the audio) while automatically presenting a contextual interface element that indicates the transition from the caption state to the mute state —e.g., a "CAPTIONS OFF" message adjacent to the caption indicator in which a highlight region is positioned over the lowest volume setting and causing the caption information associated with the video content item to cease being presented.

In some embodiments, at least some of the above described blocks of the process of FIGS. 4 and 5 can be executed or performed in any order or sequence not limited to the order and sequence shown in and described in connection with the figure. Also, some of the above blocks of FIGS. 4 and 5 can be executed or performed substantially simultaneously where appropriate or in parallel to reduce latency and processing times. Additionally or alternatively, some of the above described blocks of the process of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for detecting and transforming rotated video content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting video captions, the method comprising:
    causing, using a hardware processor, a volume interface that corresponds to the media playback application to be presented, wherein the volume interface includes a lowest volume setting; and
    causing, using the hardware processor, the media playback application to transition from a caption state in which caption information associated with a video content item is presented to a mute state in which audio content associated with the video content item is not provided in response to determining that a user selection to increase a volume of the audio content associated with the video content item has been received while the video content item being presented in the media playback application is in the caption state, wherein the volume interface is updated by positioning a highlight region over the lowest volume setting and presenting a contextual interface element that indicates the caption state of the media playback application in which the caption information will no longer be presented.

2. The method of claim 1, wherein the method further comprises:
    causing, using the hardware processor, the media playback application to enter the caption state in which the caption information associated with the video content item is presented in response to determining that an additional user selection to decrease the volume of the audio content has been received while the media playback application is in the mute state.

3. The method of claim 2, further comprising updating the volume interface by positioning the highlight region over the lowest volume setting in the volume interface and presenting the contextual interface element that indicates the mute state of the media playback application.

4. The method of claim 1, further comprising determining that the video content item being presented in the media playback application has been placed in the mute state, wherein the volume interface is automatically updated by positioning the highlight region over the caption interface element, the contextual interface element that indicates the caption state of the media playback application is automatically presented, and the caption information associated with the video content item is automatically presented in response to determining that the video content being presented in the media playback application has been placed in the mute state.

5. The method of claim 4, further comprising:
    determining that the video content item being presented in the media playback application is no longer in the mute state; and
    automatically causing the caption information associated with the video content item to cease being presented, presenting the contextual interface that indicates the caption state of the media playback application in which the caption information will no longer be presented, and causing the caption information associated with the video content item to cease being presented.

6. The method of claim 1, wherein the contextual interface element is presented in a position adjacent to the highlight region and wherein the contextual interface element is inhibited from being presented in response to a predetermined time period elapsing.

7. The method of claim 1, further comprising:
    determining whether the caption information is available for the video content item being played back in the media playback application; and
    in response to determining that the caption information is not available for the video content item being played back in the media playback application, causing the caption interface element to be disabled from activation.

8. The method of claim 1, wherein a media device includes one or more volume buttons that, when selected, modifies the volume of the media playback application executing on the media device in which the media playback application is playing back the video content item and wherein the user selection is received using the one or more volume buttons.

9. The method of claim 1, wherein the user selection is received using a touchscreen associated with a media device.

10. A system for presenting video captions, the system comprising:
    a memory; and
    a hardware processor that:
        causes a volume interface that corresponds to the media playback application to be presented, wherein the volume interface includes a lowest volume setting; and
        causes the media playback application to transition from a caption state in which caption information associated with a video content item is presented to a mute state in which audio content associated with the video content item is not provided in response to determining that a user selection to increase a volume of the audio content associated with the video content item has been received while the video content item being presented in the media playback application is in the caption state, wherein the volume interface is updated by positioning a highlight region over the lowest volume setting and presenting a contextual interface element that indicates the caption state of the media playback application in which the caption information will no longer be presented.

11. The system of claim 10, wherein the hardware processor is further configured to:
    cause the media playback application to enter the caption state in which the caption information associated with the video content item is presented in response to determining that an additional user selection to decrease the volume of the audio content has been received while the media playback application is in the mute state.

12. The system of claim 11, wherein the hardware processor is further configured to update the volume interface by positioning the highlight region over the lowest volume setting in the volume interface and presenting the contextual interface element that indicates the mute state of the media playback application.

13. The system of claim 10, wherein the hardware processor is further configured to determine that the video content item being presented in the media playback application has been placed in the mute state, wherein the volume interface is automatically updated by positioning the highlight region over the caption interface element, the contextual interface element that indicates the caption state of the media playback application is automatically presented, and the caption information associated with the video content item is automatically presented in response to determining that the video content being presented in the media playback application has been placed in the mute state.

14. The system of claim 13, wherein the hardware processor is further configured to:
   determine that the video content item being presented in the media playback application is no longer in the mute state; and
   automatically cause the caption information associated with the video content item to cease being presented, presenting the contextual interface that indicates the caption state of the media playback application in which the caption information will no longer be presented, and causing the caption information associated with the video content item to cease being presented.

15. The system of claim 10, wherein the contextual interface element is presented in a position adjacent to the highlight region and wherein the contextual interface element is inhibited from being presented in response to a predetermined time period elapsing.

16. The system of claim 10, wherein the hardware processor is further configured to:
   determine whether the caption information is available for the video content item being played back in the media playback application; and
   in response to determining that the caption information is not available for the video content item being played back in the media playback application, cause the caption interface element to be disabled from activation.

17. The system of claim 10, wherein a media device includes one or more volume buttons that, when selected, modifies the volume of the media playback application executing on the media device in which the media playback application is playing back the video content item and wherein the user selection is received using the one or more volume buttons.

18. The system of claim 10, wherein the user selection is received using a touchscreen associated with a media device.

19. A non-transitory computer-readable medium containing computer-executable instructions that, when executed by a processor, cause the processor to perform a method for presenting video captions, the method comprising:
   causing a volume interface that corresponds to the media playback application to be presented, wherein the volume interface includes a lowest volume setting; and
   causing the media playback application to transition from a caption state in which caption information associated with a video content item is presented to a mute state in which audio content associated with the video content item is not provided in response to determining that a user selection to increase a volume of the audio content associated with the video content item has been received while the video content item being presented in the media playback application is in the caption state, wherein the volume interface is updated by positioning a highlight region over the lowest volume setting and presenting a contextual interface element that indicates the caption state of the media playback application in which the caption information will no longer be presented.

20. The non-transitory computer-readable medium of claim 19, wherein the method further comprises:
   causing the media playback application to enter the caption state in which the caption information associated with the video content item is presented in response to determining that an additional user selection to decrease the volume of the audio content has been received while the media playback application is in the mute state.

* * * * *